(12) United States Patent
Paielli et al.

(10) Patent No.: US 9,777,819 B2
(45) Date of Patent: Oct. 3, 2017

(54) MODULAR ELECTRONIC DIFFERENTIAL CONTROL SYSTEM

(71) Applicant: DANA AUTOMOTIVE SYSTEMS GROUP, LLC, Maumee, OH (US)

(72) Inventors: Perry M. Paielli, Grass Lake, MI (US); Michael Z. Creech, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/120,915

(22) PCT Filed: Feb. 25, 2015

(86) PCT No.: PCT/US2015/017602
§ 371 (c)(1),
(2) Date: Aug. 23, 2016

(87) PCT Pub. No.: WO2015/130847
PCT Pub. Date: Sep. 3, 2015

(65) Prior Publication Data
US 2016/0363204 A1    Dec. 15, 2016

Related U.S. Application Data

(60) Provisional application No. 61/944,185, filed on Feb. 25, 2014.

(51) Int. Cl.
*F16H 48/30* (2012.01)
*F16H 48/34* (2012.01)
*F16H 48/20* (2012.01)

(52) U.S. Cl.
CPC ....... *F16H 48/34* (2013.01); *F16H 2048/204* (2013.01)

(58) Field of Classification Search
CPC ........................... F16H 48/34; F16H 2048/204
See application file for complete search history.

(56) References Cited

U.S. PATENT DOCUMENTS 4,340,133 A * 7/1982 Blersch ................... F16D 27/09
                                                    192/30 W
5,538,118 A   7/1996 Kempf et al.
(Continued)

FOREIGN PATENT DOCUMENTS

EP          1435479 A2    7/2004

OTHER PUBLICATIONS

European Patent Office, International Search Report with Written Opinion, Jun. 5, 2015, 8 pages, European Patent Office, Rijswijk, Netherlands.

*Primary Examiner* — David J Hlavka
(74) *Attorney, Agent, or Firm* — Marshall & Melhorn, LLC

(57) ABSTRACT

A modular electronic control system for a differential is described. Such a control system can contain an actuator and sensor in the differential casing and a connection between these elements in the differential casing and a controller outside the differential. The controller can be in the form of a printed circuit board residing in a control housing attached to the differential casing. In alternative embodiments, the controller may also be more distally located in the vehicle, where the controller housing contains means for conducting electrical signals from the interior of the differential casing to the vehicle without containing a printed circuit board. The controller may also contain a thermally conductive portion for dissipating heat generated by the controller.

11 Claims, 3 Drawing Sheets

(56) References Cited

U.S. PATENT DOCUMENTS

| | | | |
|---|---|---|---|
| 5,560,462 A | 10/1996 | Gustin | |
| 5,709,627 A * | 1/1998 | Teraoka | F16H 48/08 184/6.23 |
| 5,749,801 A * | 5/1998 | Teraoka | F16H 48/08 475/88 |
| 6,913,129 B2 * | 7/2005 | Ezure | G01P 1/026 192/113.4 |
| 6,945,895 B2 * | 9/2005 | Fusegi | B60K 23/04 180/247 |
| 7,211,020 B2 | 5/2007 | Gohl et al | |
| 7,241,243 B2 | 7/2007 | Duncan | |
| 7,264,568 B2 | 9/2007 | Ludwig et al. | |
| 7,357,749 B2 * | 4/2008 | Nofzinger | F16H 48/08 475/157 |
| 7,374,508 B2 | 5/2008 | Duncan | |
| 7,384,359 B2 | 6/2008 | Pinkos | |
| 7,425,185 B2 | 9/2008 | Donofrio et al. | |
| 7,507,176 B2 | 3/2009 | Pinkos | |
| 7,534,187 B2 | 5/2009 | Donofrio et al. | |
| 7,572,202 B2 | 8/2009 | Donofrio et al. | |
| 7,602,271 B2 | 10/2009 | York et al. | |
| 7,682,279 B2 | 3/2010 | Donofrio et al. | |
| 7,744,500 B2 | 6/2010 | Donofrio et al. | |
| 7,764,154 B2 | 7/2010 | York et al. | |
| 7,785,224 B2 | 8/2010 | York et al. | |
| 7,825,759 B2 | 11/2010 | York et al. | |
| 7,837,585 B2 | 11/2010 | Pinkos et al. | |
| 7,876,186 B2 | 1/2011 | York et al. | |
| 7,878,314 B2 | 2/2011 | Pinkos | |
| 7,942,780 B2 | 5/2011 | Donofrio et al. | |
| 8,057,345 B2 | 11/2011 | Pinkos et al. | |
| 8,182,385 B2 * | 5/2012 | Gianone | F16H 48/08 475/150 |
| 8,808,127 B2 | 8/2014 | Seidl et al. | |

* cited by examiner

MODULAR ELECTRONIC DIFFERENTIAL CONTROL SYSTEM

FIELD OF THE INVENTION

The present invention relates to a modular electronic control system for a differential.

BACKGROUND OF THE INVENTION

A vehicle differential carrier (commonly known merely as a "differential") is a device employing differential gears therein, which typically are connected to its exterior by three shafts. An input shaft transmits torque and rotation into the differential gears from a vehicle engine. In turn, each of the other two shafts separately transmit a portion of the torque and rotation from the differential gears out to separate external wheels. Regarding the operation of the differential, when a vehicle is being driven straight the differential rotates with an axle, while side and pinion gears mate but do not rotate relative to each other. However, when the vehicle turns the differential still rotates but the side and pinion gears mate and slightly rotate so that one wheel can turn faster than the other.

Hence, the differential is needed because when a vehicle is turning, as it quite often does, the outside wheel makes a larger radius than the inside wheel. As a result, the outside wheel goes a farther distance, moves faster and turns more revolutions than the inside wheel. If, however, both wheels were on the same axle shaft, in this instance, one or both wheels would have to skid or slip to make a turn. Consequently, the function of the differential allows the wheels to turn at different speeds, but at equal torque.

In certain situations it is desirable to modify the action of the differential. For instance it may be desirable to lock the differential. Those skilled in the art will recognize that there are a number of different mechanisms to lock the relative rotation between a differential gear case and one of the output side gears. Control of the locking differential involves several actions. Engagement of the differential is controlled by an actuator. The actuator is in turn powered and signaled by the vehicle through a controller. In addition, it is beneficial to have a sensor that can relay information regarding the differential back to the controller. It would be beneficial to have a differential control system including an actuator, sensor and controller that was modular. Such a modular control system would facilitate manufacture and installation. It would also provide for feedback to the vehicle about the action and status of the differential. In addition, placement of the controller in close proximity to the differential allows for calibration to be done before installation of the differential. Further, specific placement of the controller can reduce noise (usually from electromagnetic currents) found in the system.

SUMMARY OF THE INVENTION

The present invention is directed toward a modular electronic control system for a differential is described that comprises an actuator capable of selectively inducing engagement of a differential, a sensor capable of sensing engagement of a differential, a control housing, wherein the control housing comprises means of conducting electrical signals, and a connector which provides for electrical connectivity between (i) the actuator and sensor and (ii) the means of conducting electrical signals of the control housing.

In one embodiment, the control housing further comprises a printed circuit board in electrical connectivity with the connector.

In an alternative embodiment, the control system further comprises a port which provides for electrical connectivity between (i) the means of conducting electrical signals of the control housing and (ii) a vehicle wherein the control system resides.

Other embodiments include use of a Hall type sensor, an encapsulation around conducting wires between the sensor, actuator and the connector. Still other embodiments include a control housing that extends through the casing of the differential.

In an alternative embodiment, the controller has a thermally conductive portion that acts to transfer heat generated by the controller to a heat sink.

In other embodiments, the controller is attached to the axle housing.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting.

Figure 1:
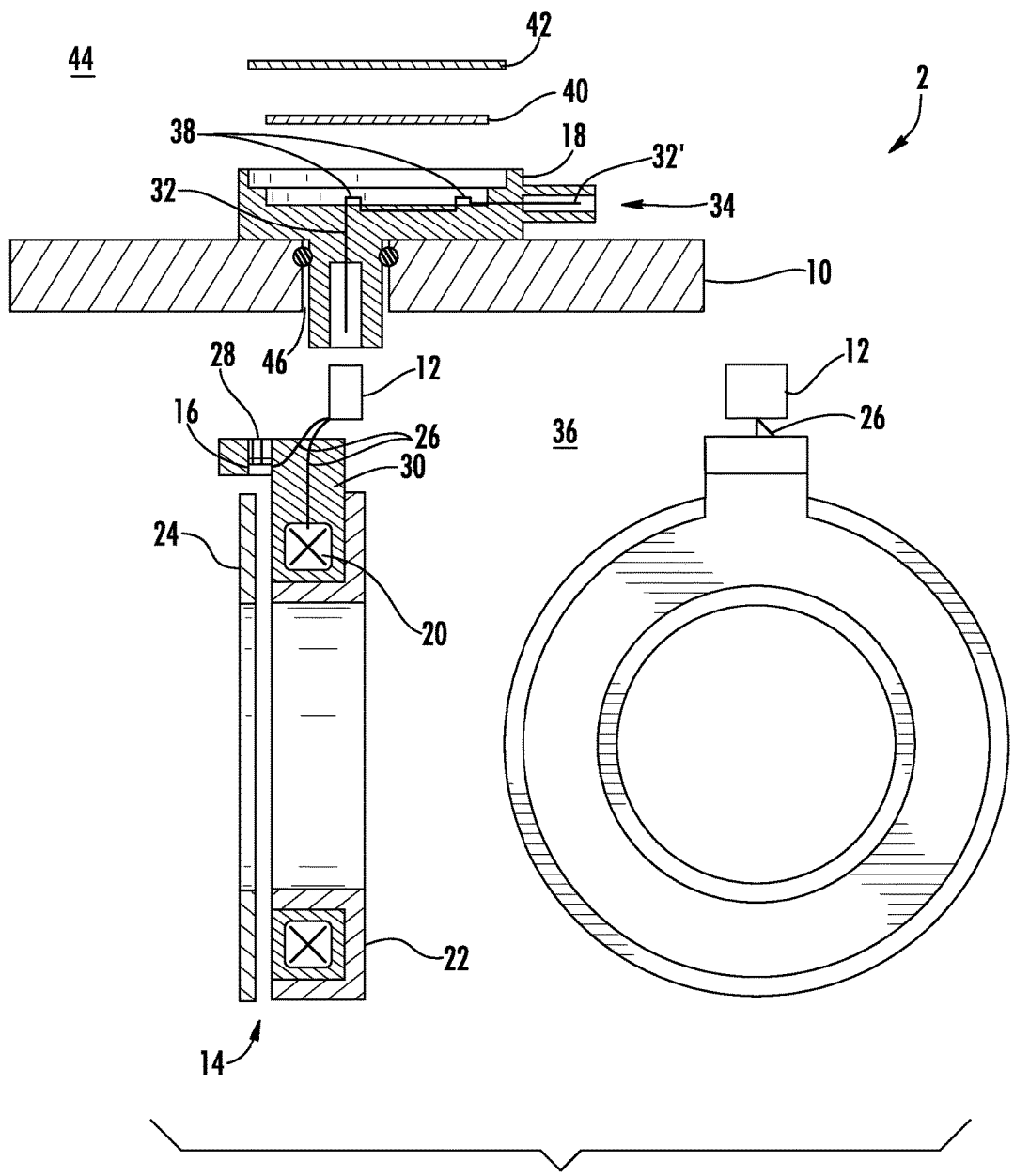
FIG. 1 is a schematic of an embodiment of the modular electronic differential control system in accordance with the present invention, including a cross-sectional view of the actuator and sensor along the axle axis as shown.

FIG. 1 illustrates a schematic of the modular electronic differential control system 2. Within the differential casing 10 is found a connector 12 that electrically connects the actuator 14 and sensor 16 to the control housing 18.

As is known in the art, the actuator 14, within the context of a differential, converts electrical current into mechanical force. Electrical current is conducted through a coil of wire 20 that is wound around the pole piece 22. The flow of electrical current creates a magnetic field that draws the actuator plunger 24 toward the pole piece 22. Each end of the coil of wire 20 is attached to its own individual connector conductor wire 26. Typically, a spring (not shown) is placed to act on the plunger 24 in a way to hold it away from the pole piece 22 when current is not flowing through the coil of wire 20. In applications with actuators 14 in a differential the plunger 24 is attached to a face gear (not shown) arranged in a dog clutch configuration (not shown) as is known in the art so as to allow clutch engagement and disengagement control through coil current control.

The position sensor 16 provides a signal that is indicative of the plunger 24 position relative to the pole piece 22. In one embodiment of the invention, the plunger 24 is made of ferromagnetic material, or has a ferromagnetic attachment. In another embodiment of the invention, the position sensor 16 is a Hall type sensor (magnetic field detector), but any suitable sensor 16 capable of sensing the position of the plunger 24 can be used in accordance with the invention. In embodiments with a Hall type sensor, the sensor 16 is positioned between a magnet 28 and the plunger 24. The output of the sensor 16 changes states when the plunger 24 moves to a position, relative to the sensor 16, that permits magnetic flux to flow from the plunger 24 to the magnet 28. The sensor 16 and magnet 28 are molded into the encapsulation 30 of the actuator coil 20. In one embodiment, the encapsulation 30 is a plastic material, but any insulating material capable of protecting the sensor 16 from the environment can be used without going beyond the scope of the invention.

Conducting wires 26 that carry the signals to/from the sensor 16 and coil 20 exit the encapsulation 30 and connect to the pins/receptacles (not shown) housed within the electrical connector 12. The electrical connector 12 joins with to the control housing 18 on the interior 36 of the differential casing 10.

The connector 12 can be mechanically attached or detached, lending to the modular nature of the control system 2 described herein, from the control housing 18 as needed. When attached, the connector 12 should be designed in such a way to also provide electrical connectivity between the conducting wires 26 and the conducting bars 32 residing in the control housing 18.

In one embodiment of the invention, the control housing 18 is made from a molded plastic, but any suitable material known in the art can be used without departing from the scope of the invention. The electrical signals of the actuator 14 and sensor 16 conduct through wires 26, into the electrical connector 12, and through to conducting bars 32 that are molded in to the controller housing 18. The conducting bars 32 are usually made of metal, but can be made of any conducting material as known in the art. Likewise, signals to/from the vehicle can be conducted through conductor bars 32'. The control housing 18 and conducting bars 32, 32' are formed in a manner that realizes a standard vehicle connector (not shown). A port 34 for a standard vehicle connector is shown in FIG. 1.

In one embodiment of the invention, intact conducting bars 32 carry signal to/from the standard vehicle connector to/from the electrical connector 12 in the interior of the differential casing 10. In this situation, the electrical signals travelling along the conducting bars 32 are not processed locally at the differential. This embodiment is not specifically shown in FIG. 1, but can easily be deduced by having a continuous electrical communication through 32, 38 and 32'.

In an alternative embodiment, the conductor bars 32 are not intact and are cut in such a way as to leave vertical portions 38, as shown in FIG. 1, upon which a printed circuit board (PCB) 40 is lowered and then attached so as to provide electrical connectivity between the PCB 40 and the conducting bars 32, 32'. In this embodiment, the PCB 40 allows for local processing of signals to/from the actuator 14 and sensor 16. The PCB 40 can provide processing, sensor interfacing, or coil drive capabilities. The PCB 40 is part of the electronic control system 2 and that receives signals and power from the vehicle, processes them and controls the actuator 14 in a manner that is defined by a control strategy. The PCB 40 also provides processing for signals back to the vehicle in a way that is determined by the control strategy.

In either alternative embodiment described above, a cover 42 can be situated on the control housing 18 so as to provide electrical insulation and seal the components housed in the control housing 18 from the environment. Another embodiment, not specifically shown in FIG. 1, but easily deduced, allows for a potting or encapsulation to be placed in the control housing 18. Any material known in the art can be used as long as it provides the necessary electrical insulation and sealingly protects the components housed in the control housing 18 from the environment.

In the embodiment shown, the PCB 40 is shown attached to both control bars 32 continuing on to the interior of the differential and control bars 32' continuing on to the standard vehicle connector. The control housing 18 is shown with a cover 42. The control housing 18 and cover 42 may be unitary.

The cover 42 and control housing 18 may be in contact with the exterior 44 of the differential casing 10. The control housing 18 may also be in contact with the differential casing 10. The control housing 18 can extend through an opening 46 in the differential casing 10.

In alternative embodiments, the controller 2 is attached to the axle housing (not shown) instead of differential casing 10. The general concept is the same, however and may be used in designs where the actuator 14 for the differential is external to the differential casing 10.

Figure 2:
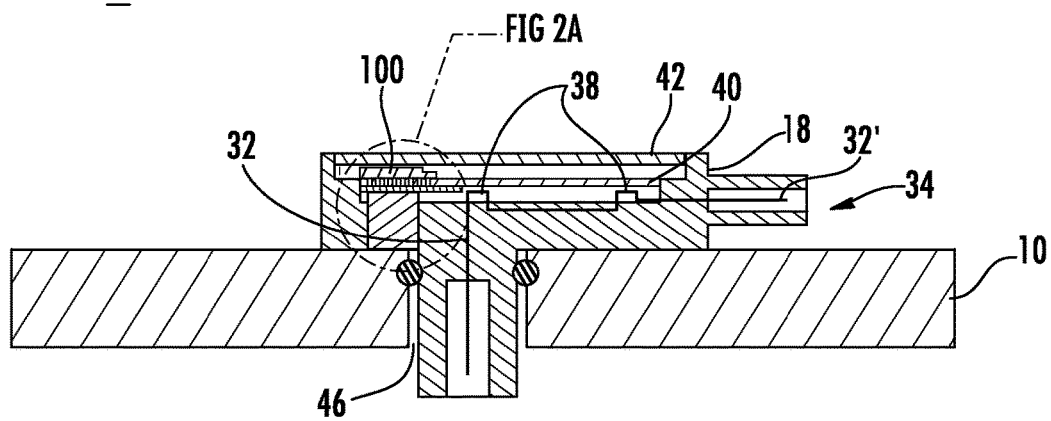
FIG. 2 is a schematic of an embodiment of a controller having a thermally conductive portion in accordance with the present invention.
Figure 3:
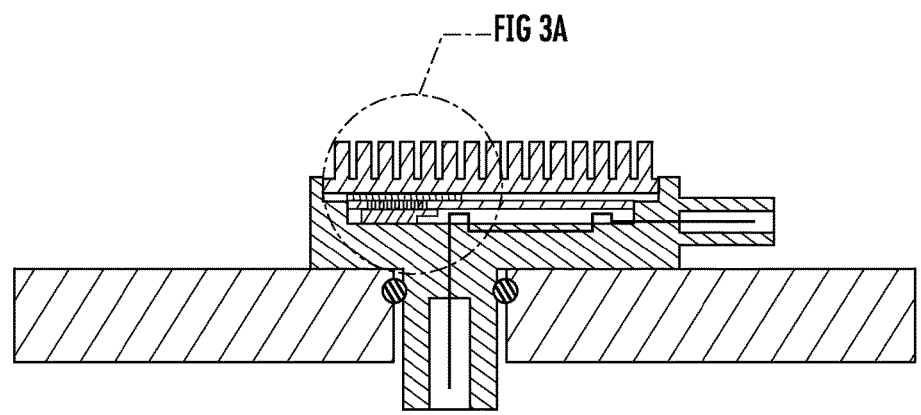
FIG. 3 is a schematic of another embodiment of a controller having a thermally conductive portion in accordance with the present invention.

One issue arising from having the controller 2 in such close proximity to the differential is heat build-up. Differentials are composed of moving parts and generate a lot of heat and are generally bathed in oil to reduce heat generated by friction as well as to help dissipate any heat that is generated. Aside from differentials and axles creating hot environments, the controller 2 itself has at least one heat generating component 100, as shown in FIGS. 2 and 3. The heat generating component 100 is usually a transistor. In specific embodiments, these are field effect transistors. In order to aid in the extra heat generated by the heat generating component 100, the controller 2 should have a heat transfer mechanism which can transfer heat from the heat generating component 100. The first portion of the heat transfer mechanism shown in both FIGS. 2 and 3 are thermal vias 106 built into the PCB 40. These thermal vias 106 are in conductive contact with a thermally conductive tape 102. The thermally conductive tape 102 is in conductive contact with a heat transfer device 104 or 108. The embodiment shown in FIG. 2 allows for heat passing through the heat transfer mechanism (combination of 102, 104, and 106) to the differential casing 10 (or in further embodiments, the axle housing (not shown)).

In FIG. 3, the heat transfer mechanism (combination of 102, 108, and 106) allows for heat to transfer to the fluid surrounding the differential casing 10 or, in alternative embodiments) the axle housing (not shown). This fluid can be either a gas or liquid and is most preferably ambient air or oil used in lubrication of the differential or axle.

Figure 2A:
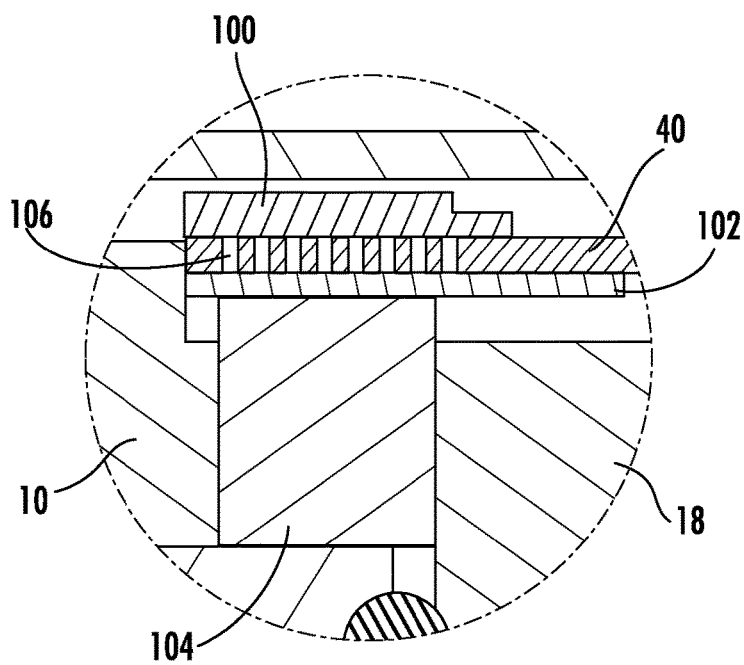
FIG. 2A shows a magnification of the area encircled in FIG. 2.
Figure 3A:
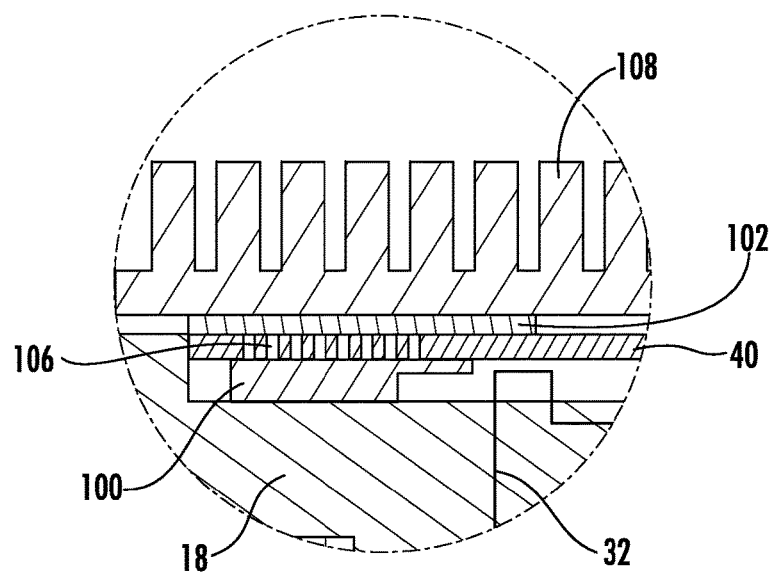
FIG. 3A shows a magnification of the area encircled in FIG. 3.

FIG. 2A and FIG. 3A show magnifications of the area encircled in FIGS. 2 and 3, respectively.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed:

1. A modular electronic differential control system comprising:
   an actuator capable of selectively inducing engagement of a differential,
   a sensor capable of sensing engagement of a differential,
   a control housing in sealing engagement with a differential casing, wherein the control housing contains means of conducting electrical signals, and
   a connector which provides for electrical connectivity between (i) the actuator and sensor and (ii) the means of conducting electrical signals of the control housing.

2. The modular electronic differential control system of claim 1, wherein the control housing further comprises a printed circuit board in electrical connectivity with the connector.

3. The modular electronic differential control system of claim 1, further comprising a port which provides for electrical connectivity between (i) the means of conducting electrical signals of the control housing and (ii) a vehicle wherein the control system resides.

4. The modular electronic differential control system of claim 1, wherein the connector is inside the differential casing.

5. The modular electronic differential control system of claim 1, further comprising a thermally conductive portion.

6. The modular electronic differential control system of claim 5, wherein the thermally conductive portion dissipates heat to the differential casing.

7. The modular electronic differential control system of claim 5, wherein the thermally conductive portion dissipates heat to a fluid surrounding the control system.

8. The modular electronic differential control system of claim 7, wherein the fluid is air.

9. The modular electronic differential control system of claim 7, wherein the fluid is an oil.

10. A modular electronic differential control system comprising:
    an actuator capable of selectively inducing engagement of a differential,
    a sensor capable of sensing engagement of a differential,
    a control housing in sealing engagement with an axle housing, wherein the control housing contains means of conducting electrical signals, and
    a connector which provides for electrical connectivity between (i) the actuator and sensor and (ii) the means of conducting electrical signals of the control housing.

11. A modular electronic differential control system comprising:
    i. an actuator capable of selectively inducing engagement of a differential,
    ii. a sensor capable of sensing engagement of a differential,
    iii. a control housing, wherein the control housing comprises means of conducting electrical signals, and
    iv. a connector which provides for electrical connectivity between (1) the actuator and sensor and (2) the means of conducting electrical signals, wherein the connector resides within a differential casing.

* * * * *